No. 714,803. Patented Dec. 2, 1902.
C. KREMNITZ.
PATTERN GRINDING APPARATUS FOR SHAPING TOOLS OF DIFFERENT PATTERNS.
(Application filed June 23, 1902.)
(No Model.) 2 Sheets—Sheet 1.

Witnesses:
Henry Harper.
Woldemar Haupt

Inventor:
Carl Kremnitz

No. 714,803. Patented Dec. 2, 1902.
C. KREMNITZ.
PATTERN GRINDING APPARATUS FOR SHAPING TOOLS OF DIFFERENT PATTERNS.
(Application filed June 23, 1902.)
(No Model.) 2 Sheets—Sheet 2.

UNITED STATES PATENT OFFICE.

CARL KREMNITZ, OF SPANDAU, GERMANY.

PATTERN-GRINDING APPARATUS FOR SHAPING-TOOLS OF DIFFERENT PATTERNS.

SPECIFICATION forming part of Letters Patent No. 714,803, dated December 2, 1902.

Application filed June 23, 1902. Serial No. 112,910. (No model.)

*To all whom it may concern:*

Be it known that I, CARL KREMNITZ, foreman, a subject of the King of Prussia, German Emperor, residing at 14 Linden Ufer, in the city of Spandau, Kingdom of Prussia, and German Empire, have invented a certain new and useful Pattern-Grinding Apparatus for Shaping-Tools of Different Patterns, of which the following is a specification.

It is a well-known fact that shaping-tools when submitted to the process of hardening lose their shape and have to be adjusted by grinding. For the grinding of less complicated shapes, such as straight tools or circular arcs, various devices are already employed. This invention is intended to overcome these difficulties; and it has for its object the construction of an apparatus by means of which even more complicated shaping-tools may be accurately and uniformly adjusted by grinding. This grinding, which constitutes the finishing operation, is effected in my invention by mounting the shaping-tool upon a mandrel and moving the same with a step-by-step movement past the grinding-disk by means of a pattern fixed to the carriage of the mandrel in a path exactly corresponding to the shape of the pattern.

Figure 1:
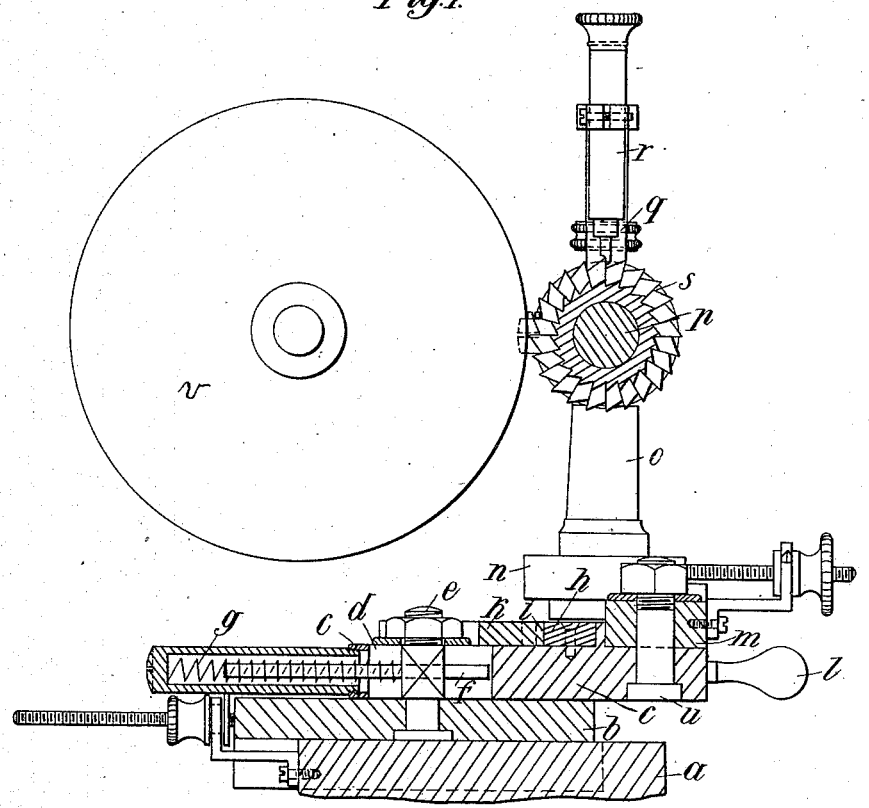
Figure 2:
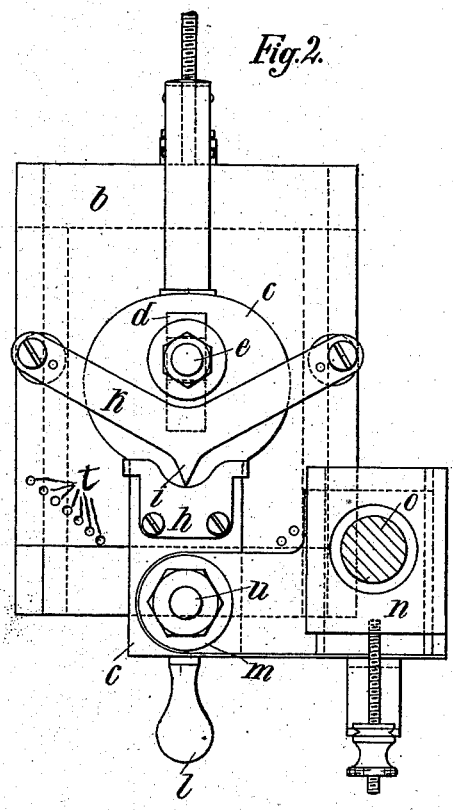
Figure 3:
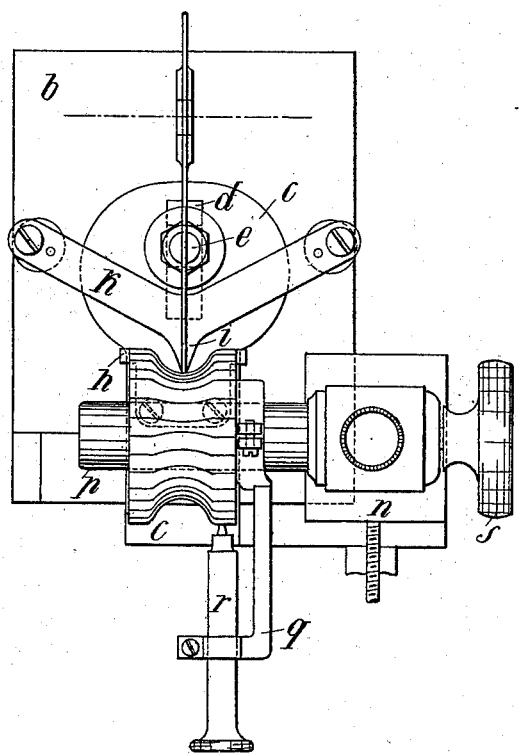

In the drawings, Figure 1 is a cross-section of the apparatus in the position previous to the movement of the shaper toward the grinding-disk. Fig. 2 is a plan view of the same without the support for the shaping-tool. Fig. 3 is a top view of the apparatus in the position of grinding, the support for the shaper being given a quarter-turn.

In a dovetail guide $a$ the carriage $b$ may be displaced, within which another carriage $c$ is movable, so as to be capable of a movement both in a straight and in a circular path. This is effected by providing the carriage $c$ with a slot $d$, which allows of a displacement of the carriage $c$ with relation to the bolt $e$, rotatably journaled in the carriage $b$ and guided within the slot $d$. A spiral spring $g$, surrounding the guide-rod $f$, counteracts the longitudinal movement of the carriage in the direction of the handle $l$ and retains the pattern $h$, which is mounted on the carriage $c$, tightly pressed against the tongue $i$ of a cross-piece $k$, which may be rigidly or displaceably connected to the carriage $b$. Upon the bolt $u$, which is secured to the carriage $c$, is provided a cross-piece $m$, upon which the standard $o$ of the shaping-support is displaceably mounted by means of a small slide or carriage $n$.

In the upper part of the standard $o$ the mandrel $p$ for the mounting of the shaping-tool to be ground is journaled and may be adjusted in a longitudinal direction by means of a screw $s$. The shaper is secured by a spring-acting finger $r$, which engages between the teeth of the shaper and which is fixed in a support $q$, clamped to the mandrel $p$. Studs are inserted into the holes $t$ upon the surface of the carriage $b$ to act as a stop for the movement of the carriage $c$.

The operation of the device is as follows: The shaping-tool which it is desired to grind is secured upon the mandrel $p$ by means of the finger $r$, so that one of the teeth of the shaper is in the same horizontal plane with the center. This tooth is so adjusted that a perpendicular drawn at its outline corresponds with the curve of the pattern. By rotating the support of the shaper with relation to the pattern $h$ both tools are brought into parallel position, while the relative displacement in a vertical line is effected by the screw $s$ and the carriage $n$ and by means of an angle. The carriage $b$, with the adjusted shaper, may now be moved toward the grinding-disk, and by rotating the carriage $c$ by means of the handle $l$ the shaper is moved around the disk, so that the grinding is effected exactly in accordance with the shape of the pattern $h$, the spring $g$ keeping the tongue $i$ always tightly pressed against the pattern $h$. After the tooth has been ground and finished the retaining-finger is released and the shaper is moved for another tooth.

What I claim, and desire to secure by Letters Patent of the United States, is—

Pattern-grinding apparatus for shaping-tools of different pattern, comprising a carriage $c$, a pattern $h$ for the grinding of the shaper mounted upon said carriage, a cross-piece $k$ connected with the carriage and a guide-tongue $i$ upon said cross-piece, in combination with a grinding-disk $v$ and means to rotate the carriage and to move the same in a longitudinal direction and means to adjust the shaping-tool above the pattern $h$, so as to obtain an exact grinding of the shaper in accordance with the shape of the pattern upon rotating and moving the pattern $h$ along the tongue $i$ and past the grinding-disk $v$ arranged above the said guide-tongue.

In witness whereof I have hereunto signed my name in the presence of two subscribing witnesses.

CARL KREMNITZ.

Witnesses:
　HENRY HASPER,
　WOLDEMAR HAUPT.